(12) United States Patent
Moricz et al.

(10) Patent No.: US 6,411,950 B1
(45) Date of Patent: Jun. 25, 2002

(54) DYNAMIC QUERY EXPANSION

(75) Inventors: Michael Z. Moricz, Sunnyvale; Louis M. Monier, Redwood City; Jean-Claude Michelou, San Mateo, all of CA (US)

(73) Assignee: Compaq Information Technologies Group, LP, Houston, TX (US)

( * ) Notice: Subject to any disclaimer, the term of this patent is extended or adjusted under 35 U.S.C. 154(b) by 0 days.

(21) Appl. No.: 09/201,624

(22) Filed: Nov. 30, 1998

(51) Int. Cl.$^7$ .............................................. G06F 17/30
(52) U.S. Cl. ................................. 707/3; 707/5
(58) Field of Search ........................... 707/3, 4, 5, 521, 707/531, 10, 103

(56) References Cited

U.S. PATENT DOCUMENTS

| | | | |
|---|---|---|---|
| 5,819,260 A | * 10/1998 | Lu et al. | 707/3 |
| 5,963,965 A | * 10/1999 | Vogel | 707/501 |
| 5,974,455 A | * 10/1999 | Monier | 709/223 |
| 5,987,446 A | * 11/1999 | Corey et al. | 707/3 |
| 6,006,223 A | * 12/1999 | Agrawal et al. | 707/5 |
| 6,070,158 A | * 5/2000 | Kirsch et al. | 707/3 |
| 6,101,491 A | * 8/2000 | Woods | 707/3 |
| 6,101,515 A | * 8/2000 | Wical et al. | 707/531 |
| 6,112,203 A | * 8/2000 | Bharat et al. | 707/5 |
| 6,144,958 A | * 11/2000 | Ortega et al. | 707/5 |

OTHER PUBLICATIONS

Mining term association rules for automatic global query expansion:methodology and preliminary results by Wei et , National University of Singapore, pp. 366–373, Jan. 2000 (IEEE publication).*

* cited by examiner

Primary Examiner—Diane D. Mizrahi
(74) Attorney, Agent, or Firm—Pennie & Edmonds LLP (57) ABSTRACT

A dynamic search result refinement for refining a general search query into a more specific search query. For a general search query, a user is presented with a list of more specific queries. The entries in the list selected from a log-file of queries according to the index frequency of each query. The user can choose a new query from the list of more specific queries and run a database search. The user also has the option to be presented with a list of even more specific queries based on the chosen query and to have a database search run with one of these queries.

29 Claims, 5 Drawing Sheets

DYNAMIC QUERY EXPANSION

BACKGROUND OF THE INVENTION

1. Field of the Invention

The present invention relates to a method and apparatus for searching records stored in an electronic database. More specifically, but not by way of limitation, the present invention relates to a method and apparatus for dynamic search result refinement by refining a vague text-search query into a more specific text-search query.

2. Description of the Related Art

In recent years, the amount of text-based data electronically stored has grown tremendously. This text-based information includes everything from E-mail messages to patient records to world wide web (Web) pages. Specifically, much of the growth in stored text-based data is a direct result of the explosion in the number of Web pages. As anyone who has attempted to search the Web or any large database knows, however, Web pages and database records are practically useless unless they can be searched rapidly, accurately and efficiently. To aid in such searching, a number of search engines using a variety of techniques are available.

Figure 1:
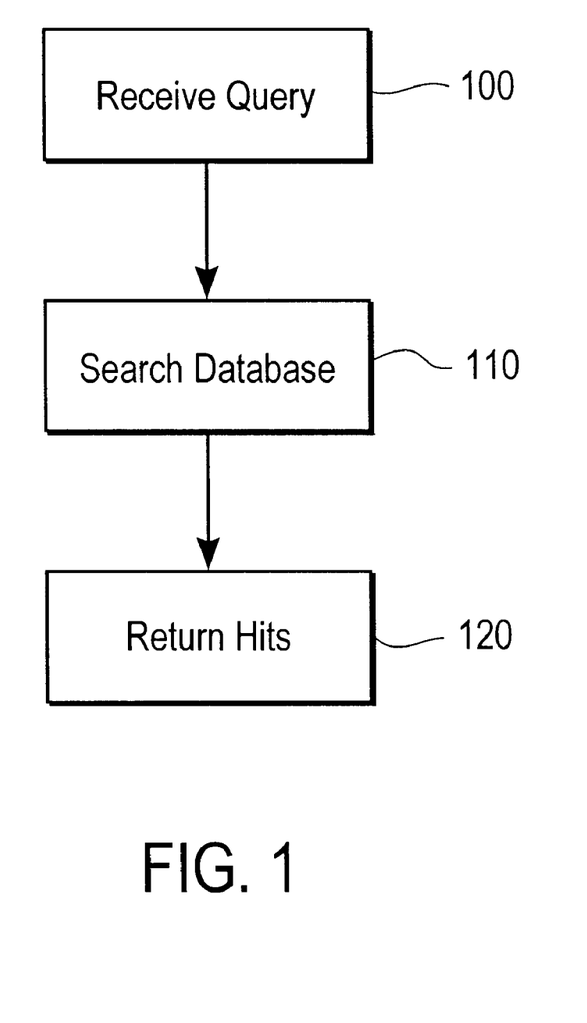
FIG. 1 is a block diagram of a process used by current search engines.

A common and accurate searching technique is full-text searching—shown in FIG. 1. In a full-text search, the entire text that is to be searched, e.g., a database record, is scanned to find a match with a particular received query. Steps 100 and 110. When a match between that which is scanned and the search query is located, the location of the match is returned as a search result—called a hit. Step 120. This location corresponds to a particular database record or in terms of the Web, the location or the URL of a particular Web page.

Although full-text searching is very accurate, this accuracy sometimes presents major drawbacks. For a very specific query, the full-text search is accurate and efficient in that it returns only a few locations. Thus, a user can quickly scan through the records corresponding to these returned locations. In essence, full-text searching is most useful and most powerful when it is searching for a needle in a haystack. If, however, a user is not searching for such a needle, i.e., does not have a very specific query, the full-text search is cumbersome and inefficient. For example, if the user attempts to search the Web for the phrase "New York," a full-text search could return millions of hits. obviously, it would be virtually impossible for the user to wade through millions of records to find specific records of interest. Even if the particular site for which the user is searching is included in the hits, the user could easily overlook this site because it is buried among the other records.

One way to reduce the number of hits from a full-text search is to narrow the search term. For instance, the phrase "New York" could be narrowed to "New York transit." Although it may seem elementary to modify the query by, for example, adding another term, many times it is not clear as to which term to add or how to otherwise modify the query. If a user is looking for commuter buses leaving New York City, it is not clear whether the proper query would include "buses", "commuter", "transit", or any combination thereof. Very possibly, the proper query might involve terms that elude a user, i.e., "port authority,"—because many commuter buses leave from the New York Port Authority.

Some current search engines provide a user with possible or suggested terms to be added to their search. For example, a search engine might suggest that for the query "law" one of the following terms be added: "legal," "intellectual," "court" or "appeals." Thus, the new search could be, e.g., "law appeals" or "law legal." Thus, the suggested query is not a coherent phrase but rather a jumble of related words. The flaw with these current search engines is that the suggested terms do not necessarily focus a user's search. An additional flaw with these current search engines is that their list of suggested terms is not dynamically updated to reflect the most popular or most requested records.

Accordingly, an invention is needed that provides the user the ability to focus a general search query so that a user can readily refine a general search query until the search results contain a usable amount of record locations. Further, an invention is needed that dynamically generates lists of more specific queries for a given query, thereby giving a user the most up-to-date and most popular choices for query refinement.

SUMMARY OF THE INVENTION

The present invention overcomes the above identified problems as well as other deficiencies of existing technologies by providing, in one aspect, a method for generating an index useable to refine a vague query into more specific queries for searching stored records. The method includes the step of generating a phrase list. This phrase list can be constructed by receiving a number of queries from various users and then extracting phrases from those queries. These extracted phrases may be quoted phrases, i.e., user's search phrases that were placed in quotation marks. Further, the phrase list could include only those phrases that are determined to be statistically significant. The statistical significance of the search phrase may be determined by the number of times a particular phrase appears in the received user queries. This number is the query frequency.

Another step of the method of this invention includes computing the index frequency of the phrases in the phrase list. The index frequency indicates to what degree a phrase is general or specific, and it can be calculated a number of ways. For example, the index frequency for a particular phrase can be the number of times that the particular phrase appears in all the html pages associated with a particular search engine database.

It is contemplated that in one embodiment of the present invention, a step is included that determines whether the frequency for a particular phrase is lower than that of another particular phrase. Good results have been achieved by utilizing either of the index frequency or the query frequency. In using the index frequency, if the index frequency for one particular phrase is lower than that of another particular phrase, the present invention stores the two phrases in an index, the two phrases being associated with each other in the index. In one embodiment, the two phrases are stored in an index only if the index frequency for one phrase is many times larger, e.g. 10 times larger, than that of another particular phrase. Regardless of what difference is required in the index frequencies, for the two phrases to be stored in the index, the two phrases should be at least partial syntactic matches. In other words, the two phrases should share at least one common term before the two phrases can be stored in the index. It is contemplated to be within the scope of this invention that the two phrase can be stored in the index if the common terms are similar but not an exact match.

In an additional embodiment, the method of the invention includes the step of receiving a query from a user. If an entry similar to this query is stored in an index, index entries associated with the that entry are transmitted to the user. The user then can use the transmitted index entries to either search the database or to further refine the original query.

BRIEF DESCRIPTION OF THE DRAWINGS

A more complete understanding of the method and system of the present invention may be obtained by reference to the detailed description of the preferred embodiment(s) that follow, taken in conjunction with the accompanying drawings.

DETAILED DESCRIPTION OF THE PREFERRED EMBODIMENT

Figure 2:
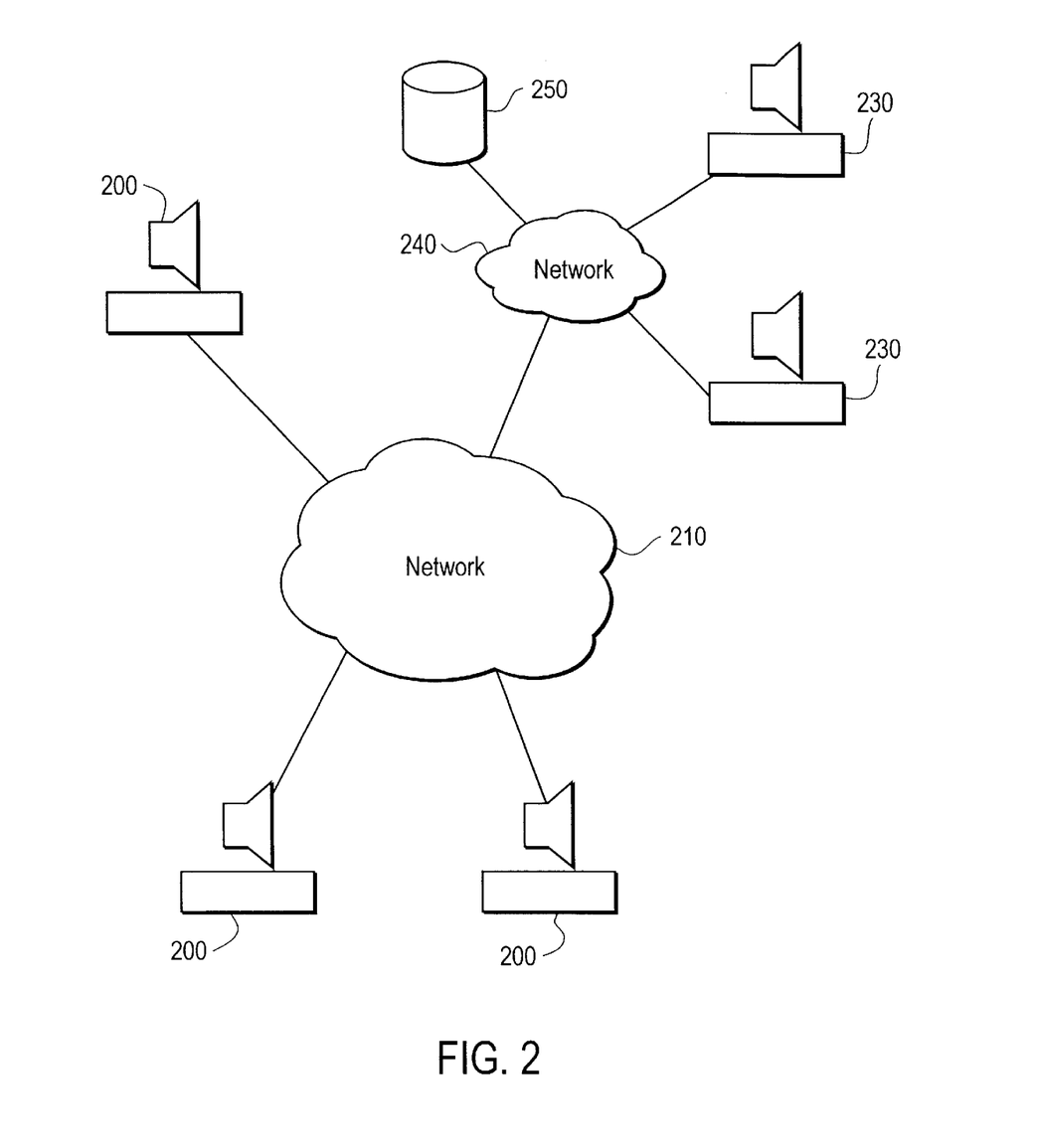
FIG. 2 illustrates a computer system in accordance with the present invention.

In one embodiment, the present invention generates an index of queries by utilizing a log-file created by a search engine such as Alta Vista. A log-file is created by capturing all user queries transmitted to the search engine. These queries can be transmitted between computers 200 attached to a network 210 and a search engine run by computers 230, which are attached to another network 240. Some log-files, such as the one created by the Alta Vista search engine, capture each query in the exact format as was entered by the user. Thus, in this type of log-file, all punctuation, capitalization and quotations are preserved. Depending on the popularity of the particular search engine, a log-file may grow to contain a large number of entries. Accordingly, to efficiently store the log-file, the data may be manipulated and stored according to data handling techniques. If necessary, the log-file can be stored in distributed storage 250.

Figure 3:
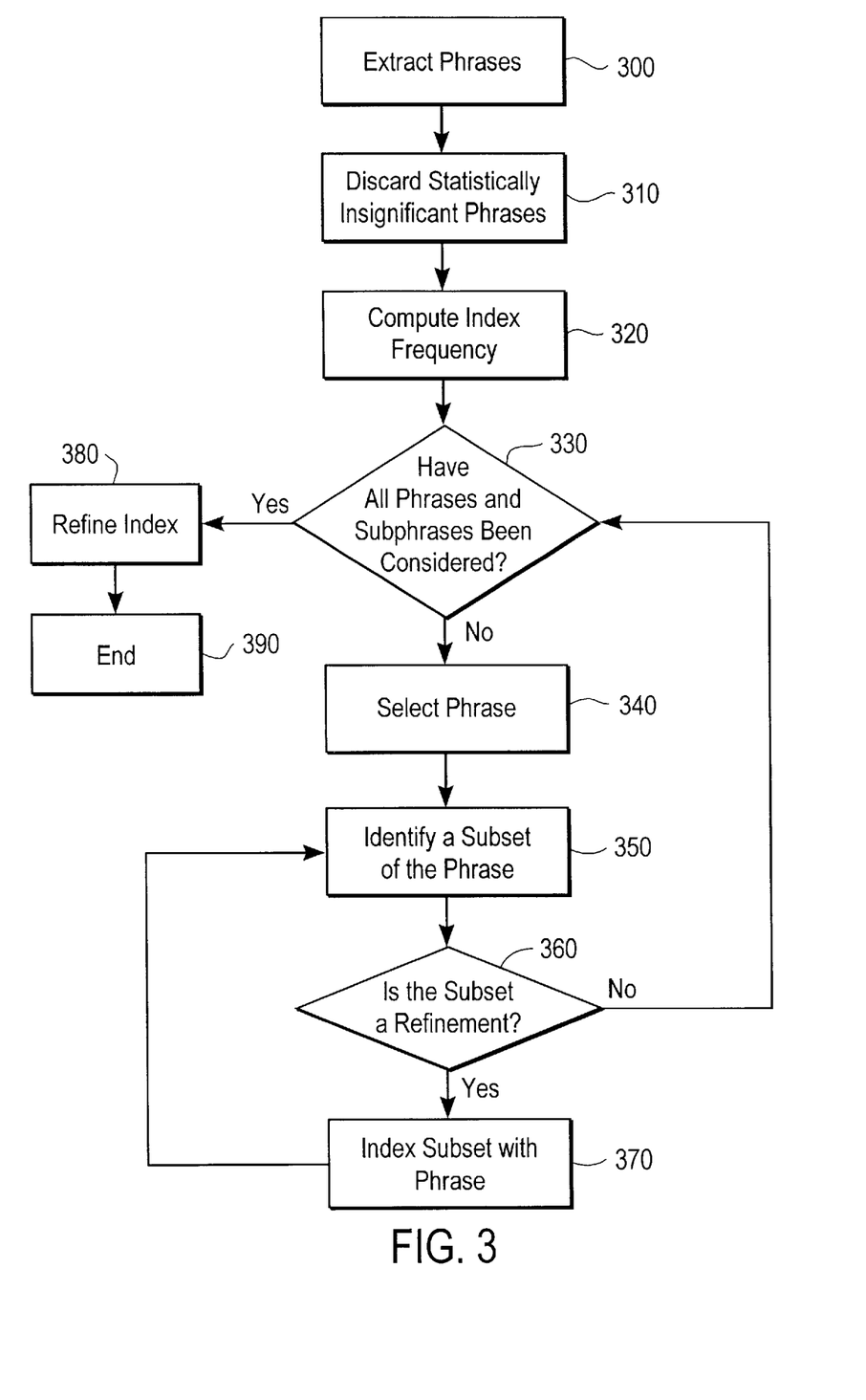
FIG. 3 is a block diagram showing the process for building a query refinement index.

Referring now to FIG. 3, there is illustrated a block flow diagram detailing a process for building a query refinement index. From a log-file, any quoted phrases are identified and in certain embodiments, extracted, i.e., any text between quotation marks is identified and extracted. Step 300. Not every extracted phrase, however, need be quoted. For example, non-quoted phrases such as "New York" or "Bill Clinton" may be recognized and extracted. Further, phrases may be extracted that are set off by indicators other than quotation marks.

Not all of the extracted phrases will be necessarily useful in refining a user's query. Certain -extracted phrases will contain misspellings or very specific phrases that appear only a few times throughout the Web or that only appeal to a few users. Thus, for convenience and to control the amount of data stored, these certain phrases are discarded or in the case of misspellings, the phrases can be corrected. The determination of which phrases to discard is based upon statistical analysis of the popularity of that phrase as a query. Step 310. The popularity of a particular query (called the query frequency) is determined by the number of times that the search engine receives that query. Queries such as "New York" will have a high query frequency and queries such as "eigen value theorem" will have a low query frequency. This result is not unexpected because when compared to the eigen value theorem, more people are interested in New York. Although the query frequency for "eigen value theorem" might be low, the phrase still might be useful in refining a user query. Any of the well-known statistical techniques can be used to determine exactly how low a query frequency must be before the associated phrase is no longer useful and, thus, considered statistically insignificant.

It is contemplated that in one embodiment, for each extracted phrase, an index frequency will be computed. Step 320. If statistically insignificant phrases were previously discarded, then the index frequency does not need to be computed for those phrases. The index frequency can be calculated a number of ways. For instance, the index frequency can be computed as the number of times that the phrase occurs in all the html pages contained in a search engine database. Alternatively, the index frequency could be the number of records that contain the particular phrase. Regardless of how the index frequency is calculated, it indicates to what degree a particular phrase is general or specific. For example, a phrase such as "New York," as would be expected, has a high index frequency (3,394,000 according to one search engine) and, thus, would be considered a very general phrase. On the other hand, a phrase such as "eigen value theorem" has a low index frequency (5 according to one search engine) and, thus, is considered a more specific phrase.

As depicted by step 330, a determination is made as to whether all phrases and subphrases have been considered. If the determination is negative, the "no" branch is followed to step 340 and a particular phrase from the log-file is selected. Step 340. By building the index from the log-file, the index becomes dynamic and will continuously adapt to users' changing informational needs. As terms become more or less popular, their position in the index will change accordingly.

After the particular phrase is selected, a subphrase of that selected phrase is identified. Step 350. For example, the term "car rental" would be identified as a subphrase of the phrase "alamo car rental." A determination is then made as to whether the selected phrase is a refinement of the identified subphrase, e.g., whether "alamo car rental" is a refinement of "car rental." Step 360.

Although "car rental" is a subphrase of "alamo car rental," it does not necessarily follow that "alamo car rental" is a refinement of "car rental." In one embodiment, for the selected phrase to qualify as a refinement, the subphrase should have an index frequency or query frequency higher than that of the particular phrase. In another embodiment, the subphrase must have an index frequency or query frequency higher than that of a particular phrase but lower that of another subphrase of terms included in the particular phrase, or in other words, the index frequency or query frequency for the subphrase must fall within a certain range. In this embodiment, for "car rental" to be a refinement of "car," the query frequency or the index frequency for "car rental" should be higher than that of "alamo car rental" and lower than that of "car."

If the determination is made in step 360 that the identified subphrase does not qualify as a refinement, the "no" branch is followed back to step 330. If, however, the "yes" branch is followed in step 360, then the identified subphrase qualifies as a refinement, and the subphrase and the particular phrase are stored in association with each other. Step 370. The two data pieces can be associated with each other in accordance with any number of data structure construction techniques. For example, the subphrase may be stored with a pointer pointing. to the particular phrase. As illustrated by the loop between step 370 and step 350, any other subsets are identified and processed in the same fashion.

The above described steps can be repeated for each subphrase of the particular phrase and for each phrase extracted from the log-file. Step 330. Thus, for the phrase "alamo car rental," the subphrases "alamo," "car," "rental," and "alamo car" would need to be processed. Depending on processing capabilities and other parameters, the inclusiveness of a subphrase can be changed. Subphrases can consist of only consecutive words or they can consist of ordered consecutive words and ordered nonconsecutive words. Alternatively, subphrases can consist of any possible permutation of a phrase or any possible permutation after certain terms within the phrase are discarded.

Regardless of the precise method for generating the index, the final index includes phrases extracted from the log-file stored in association with the subphrases for which the phrase is a refinement. In some cases, different phrases will contain similar subphrases. For example, the subphrase "car rentals" is contained in the phrases "alamo car rentals, "budget car rentals" and "enterprise car rentals." Through various well-known data structure construction techniques, storing and processing the subphrase "car rentals" numerous times can be avoided. Thus, the final index is generated and stored in an efficient, clean manner. As indicated by step 330, when the determination is made that all phrases and subphrases have been considered, the "yes" branch is followed to step 380 wherein the index can be further enhanced through various refinement means. For example, duplicates can be removed, misspellings can be removed or corrected, and permutations of queries can be processed. Another example of refinement includes setting an index frequency threshold associated with a particular phrase. If the index frequency for a particular phrase is below the threshold, the particular phrase will not be indexed. It is contemplated that the refinement step can occur throughout the process of building the index. Thus the placement of the refinement step 380 in FIG. 3 just prior to the termination step 390 is not meant to be limiting.

Figure 4:
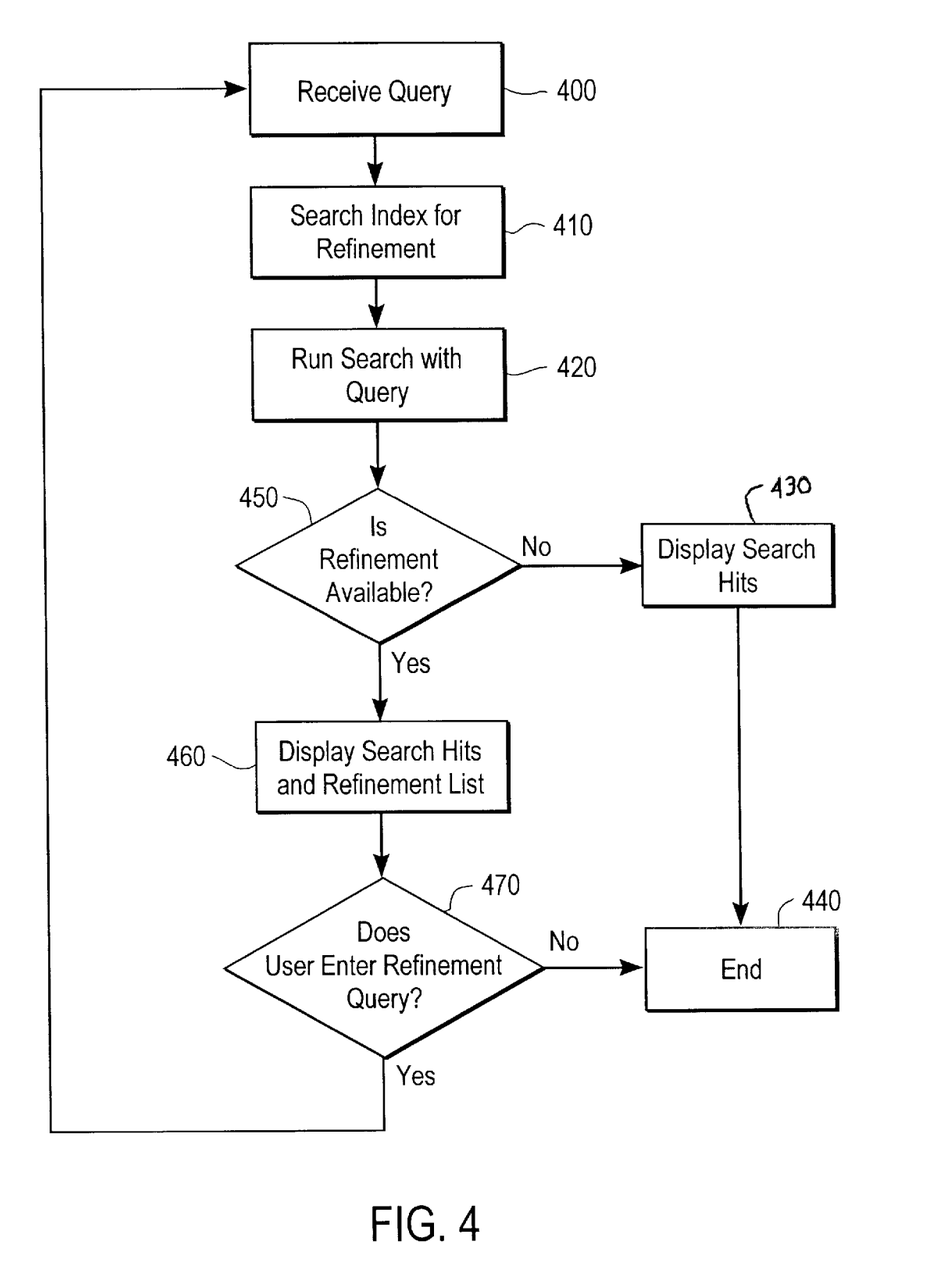
FIG. 4 is a block diagram illustrating the refinement of a query using the query refinement index.

Referring now to FIG. 4, there is illustrated a block flow diagram detailing the refinement of a query using the query refinement index wherein a user can follow the links in the index between subphrases and phrases to create a more specific query. First, the user transmits a query to the database search engine. Step 400. The index is then searched for any refinement of the query. Step 410. Whether a refinement is found or not, the search engine performs a search based upon the query. Step 420. This search can be done before, after or simultaneously with the index being searched. Next, it is determined whether a refinement is available. Step 450. If there is no refinement in the index for the particular query, the "no" branch is followed and the search engine displays the results of the search and ends the search for this query. Steps 430 and 440. If in step 450 there is a refinement in the index the "yes" branch is followed and both the results of the search and the list of refinements are displayed. Step 460. Depending on the number of possible refinements, the displayed list may be shortened for aesthetic or management reasons. The list may also be arranged in a variety of ways, such as according to the query frequency of each refinement in the list. Thus, for certain queries, the displayed refinement list may only be twenty (20) refinements with the highest query frequency. In one embodiment, the determination about which refinements to display is based at least partially upon which of the refinements is most often selected to refine a particular query. Another example of refining the display list includes setting an index frequency threshold associated with a particular phrase. If the index frequency for a particular phrase is below the threshold, the particular phrase will not be displayed.

The user is next given the option of running a new search using any of the refinements from the displayed list. Step 470. If the user chooses to run a new search with the refinements the "yes" branch is followed and the above steps are repeated with the user's chosen refined query. Thus, a user can traverse the entire list of refinements for a particular query and each time find a more focused query than the time before. If at any time the query is focused enough, the user can opt to use the results of the search engine and not to further refine the query. Step 470.

Figure 5:
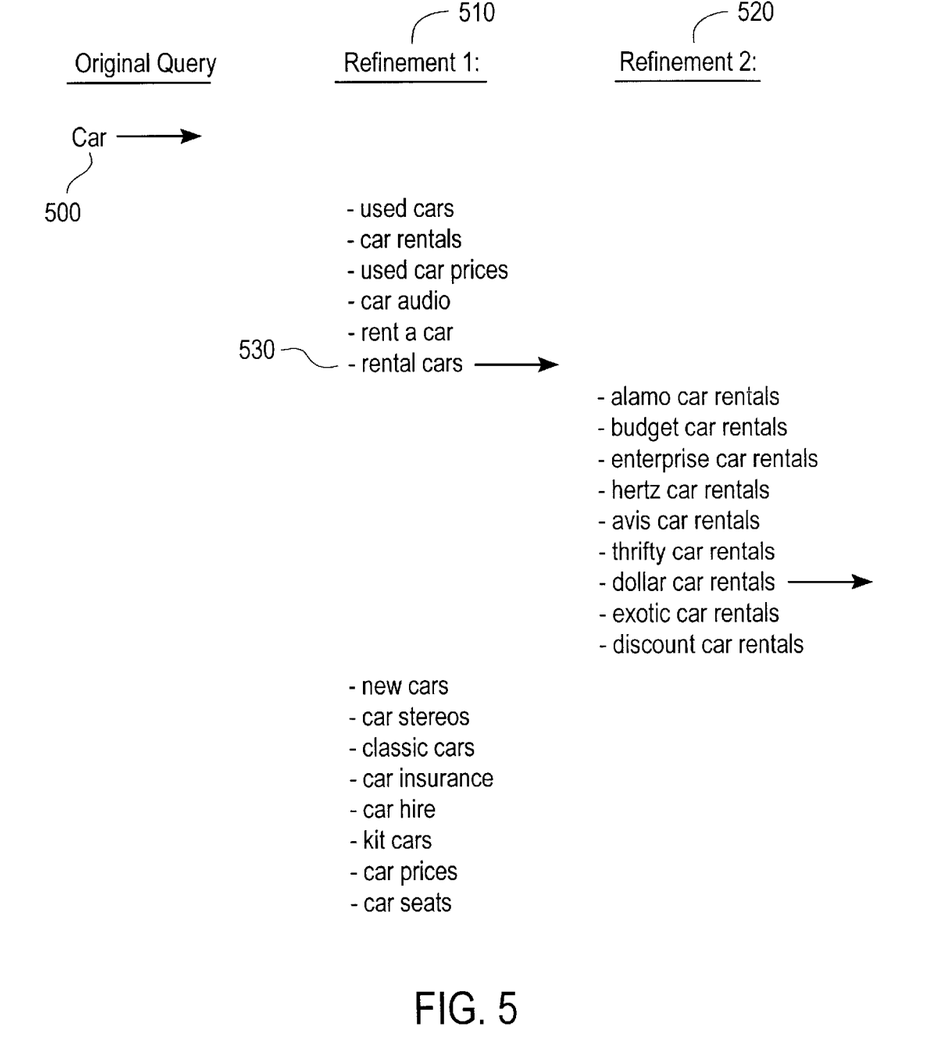
FIG. 5 illustrates the results of two refinements of an original query.

Referring now to FIG. 5, there is illustrated a portion of the results obtained by traversing the refinement index. In this example, the user transmits the original query "car" 500. The user receives back the search engine results for "car" 500 (not shown) and a list of refinements 510. From the entries in the list 510, the user chooses an additional refinement, "rental cars" 530. The term "rental cars" 530 is presented to the search engine, and as before, the user receives back the search engine results (not shown) and a new list of refinements 520. The user can then select a query from the new list of refinements 520.

Although a preferred embodiment of the method and apparatus of the present invention has been illustrated in the accompanying drawings and described in the foregoing detailed description, it is to be understood that the invention is not limited to the embodiment(s) disclosed, but is capable of numerous rearrangements, modifications and substitutions without departing from the spirit of the inventions as set forth and defined in the following claims.

What is claimed is:

1. A method for searching a plurality of stored records, the method comprising the steps of:
    generating a query refinement index comprising a plurality of phrase and refinement phrase pairs from a set of previously submitted query phrases, including, for each query phrase of a plurality of the previously submitted query phrases:
        identifying at least one subphrase of the query phrase that, in combination with the query phrase, meets at least one predefined phrase-refinement criterion, and
        storing the identified subphrase and query phrase in the query refinement index as a phrase and refinement phrase pair;
    receiving a first new query phrase from a user;
    searching the query refinement index to identify a refinement phrase in the query refinement index that is a refinement of the first new query phrase;
    retrieving the identified refinement phrase from the query refinement index; and
    transmitting the retrieved refinement phrase to the user;
    wherein:
        the retrieved refinement phrase is a suggested second new query phrase; and
        a subset of phrases in the plurality of phrase and refinement phrase pairs are multi-word phrases.

2. The method of claim 1, wherein identifying at least one subphrase includes identifying the subphrase and query phrase as meeting the at least one predefined phrase-refinement criterion only when the subphrase is a quoted phrase having more than one word.

3. The method of claim 1, wherein identifying at least one subphrase includes identifying the subphrase and query phrase as meeting the at least one predefined phrase-refinement criterion when the subphrase appears in the plurality of the previously submitted query phrases a sufficient number of times to be statistically significant.

4. The method of claim 1, wherein:

searching the query refinement index includes identifying a plurality of refinement phrases in the query refinement index, wherein each identified refinement phrase in the query refinement index is a refinement of the first new query phrase;

the retrieving includes retrieving a plurality of the identified refinement phrases from the query refinement index; and the transmitting includes transmitting at least a subset of the plurality of retrieved refinement phrases to the user;

wherein the transmitted plurality of retrieved refinement phrases are suggested second new query phrases.

5. A method for searching a plurality of stored records, the method comprising the steps of:

generating a query refinement index comprising a plurality of phrase and refinement phrase pairs from a set of previously submitted query phrases, including, for each query phrase of a plurality of the previously submitted query phrases:

computing a frequency for the query phrase and at least one subphrase of the query phrase;

determining whether the frequency for the subphrase is greater than the frequency for the query phrase;

identifying the subphrase and the query phrase as meeting at least one predefined phrase-refinement criterion when the frequency for the subphrase is greater than the frequency of the query phrase; and storing the identified subphrase and query phrase in the query refinement index as a phrase and refinement phrase pair;

receiving a first new query phrase from a user;

searching the query refinement index to identify a refinement phrase in the query refinement index that is a refinement of the first new query phrase;

retrieving the identified refinement phrase from the query refinement index; and transmitting the retrieved refinement phrase to the user;

wherein the retrieved refinement phrase is a suggested second new query phrase.

6. The method of claim 5, wherein computing the frequency of the query phrase includes computing the number of times the query phrase is included in the plurality of stored records, and computing the frequency of the subphrase includes computing the number of times the subphrase is included in the plurality of stored records.

7. The method of claim 5, wherein the at least one predefined phrase-refinement criterion is met when the frequency for the subphrase is greater than the frequency of the query phrase by at least a selected factor.

8. The method of claim 5, wherein identifying the subphrase and the query phrase as meeting the at least one predefined phrase-refinement criterion when the subphrase appears in the plurality of the previously submitted query phrases a sufficient number of times to be statistically significant.

9. The method of claim 5, wherein:

searching the query refinement index includes identifying a plurality of refinement phrases in the query refinement index, wherein each identified refinement phrase in the query refinement index is a refinement of the first new query phrase;

the retrieving includes retrieving a plurality of the identified refinement phrases from the query refinement index; and the transmitting includes transmitting at least a subset of the plurality of retrieved refinement phrases to the user;

wherein the transmitted plurality of retrieved refinement phrases are suggested second new query phrases.

10. A computer program product for use in conjunction with a computer system, the computer program product comprising a computer readable storage medium and a computer program mechanism embedded therein, the computer program mechanism comprising:

instructions for generating a query refinement index comprising a plurality of phrase and refinement phrase pairs from a set of previously submitted query phrases, including, for each query phrase of a plurality of the previously submitted query phrases, instructions for:

identifying at least one subphrase of the query phrase that, in combination with the query phrase, meets at least one predefined phrase-refinement criterion, and storing the identified subphrase and query phrase in the query refinement index as a phrase and refinement phrase pair;

instructions for receiving a first new query phrase from a user;

instructions for searching the query refinement index to identify a refinement phrase in the query refinement index that is a refinement of the the first new query phrase;

instructions for retrieving the identified refinement phrase from the query refinement index; and instructions for transmitting the retrieved refinement phrase to the user;

wherein:

the retrieved refinement phrase is a suggested second new query phrase; and a subset of phrases in the plurality of phrase and refinement phrase pairs are multi-word phrases.

11. The computer program product of claim 10, wherein the instructions for identifying at least one subphrase include instructions for identifying the subphrase and query phrase as meeting the at least one predefined phrase-refinement criterion only when the subphrase is a quoted phrase having more than one word.

12. The computer program product of claim 10, wherein the instructions for identifying at least one subphrase include instructions for identifying the subphrase and query phrase as meeting the at least one predefined phrase-refinement criterion when the subphrase appears in the plurality of the previously submitted query phrases a sufficient number of times to be statistically significant.

13. The computer program product of claim 10, wherein:

the instructions for searching the query refinement index include instructions for identifying a plurality of refinement phrases in the query refinement index, wherein each identified refinement phrase in the query refinement index is a refinement of the first new query phrase;

the instructions for retrieving include instructions for retrieving a plurality of the identified refinement phrases from the query refinement index; and the instructions for transmitting include instructions for transmitting at least a subset of the plurality of retrieved refinement phrases to the user;

wherein the transmitted plurality of retrieved refinement phrases are suggested second new query phrases.

14. A computer program product for use in conjunction with a computer system, the computer program product comprising a computer readable storage medium and a computer program mechanism embedded therein, the computer program mechanism comprising:
- instructions for generating a query refinement index comprising a plurality of phrase and refinement phrase pairs from a set of previously submitted query phrases, including, for each query phrase of a plurality of the previously submitted query phrases, instructions for:
  - computing a frequency for the query phrase and at least one subphrase of the query phrase;
  - determining whether the frequency for the subphrase is greater than the frequency for the query phrase;
  - identifying the subphrase and the query phrase as meeting at least one predefined phrase-refinement criterion when the frequency for the subphrase is greater than the frequency of the query phrase; and
  - storing the identified subphrase and query phrase in the query refinement index as a phrase and refinement phrase pair;
- instructions for receiving a first new query phrase from a user;
- instructions for searching the query refinement index to identify a refinement phrase in the query refinement index that is a refinement of the the first new query phrase;
- instructions for retrieving the identified refinement phrase from the query refinement index; and
- instructions for transmitting the retrieved refinement phrase to the user;
- wherein the retrieved refinement phrase is a suggested second new query phrase.

15. The computer program product of claim 14, wherein the at least one predefined phrase-refinement criterion is met when the frequency for the subphrase is greater than the frequency of the query phrase by at least a selected factor.

16. The computer program product of claim 14, wherein the instructions for computing the frequency of the query phrase include instructions for computing the number of times the query phrase is included in a plurality of records stored in the computer readable storage medium, and the instructions for computing the frequency of the subphrase include instructions for computing the number of times the subphrase is included in the plurality of stored records.

17. The computer program product of claim 16, wherein the instructions for identifying at least one subphrase include instructions for identifying the subphrase and query phrase as meeting the at least one predefined phrase-refinement criterion when the subphrase appears in the plurality of the previously submitted query phrases a sufficient number of times to be statistically significant.

18. The computer program product of claim 14, wherein:
- the instructions for searching the query refinement index include instructions for identifying a plurality of refinement phrases in the query refinement index, wherein each identified refinement phrase in the query refinement index is a refinement of the first new query phrase;
- the instructions for retrieving include instructions for retrieving a plurality of the identified refinement phrases from the query refinement index; and
- the instructions for transmitting include instructions for transmitting at least a subset of the plurality of retrieved refinement phrases to the user;
- wherein the transmitted plurality of retrieved refinement phrases are suggested second new query phrases.

19. A computer system for locating a particular record included in a plurality of records, the computer system comprising:
- a first storage device for storing a plurality of previously submitted query phrases;
- a processor connected to the first storage device, the processor configured for:
  - generating a query refinement index comprising a plurality of phrase and refinement phrase pairs from a set of the previously submitted query phrases, including, for each query phrase of a plurality of the previously submitted query phrases:
    - identifying at least one subphrase of the query phrase that, in combination with the query phrase, meets at least one predefined phrase-refinement criterion, and
    - storing the identified subphrase and query phrase in the query refinement index as a phrase and refinement phrase pair;
  - receiving a first new query phrase from a user;
  - searching the query refinement index to identify a refinement phrase in the query refinement index that is a refinement of the the first new query phrase;
  - retrieving the identified refinement phrase from the query refinement index; and
  - transmitting the retrieved refinement phrase to the user;
  - wherein:
    - the retrieved refinement phrase is a suggested second new query phrase; and
    - a subset of phrases in the plurality of phrase and refinement phrase pairs are multi-word phrases.

20. The computer system of claim 19, wherein the processor is configured for identifying the subphrase and query phrase as meeting the at least one predefined phrase-refinement criterion only when the subphrase is a quoted phrase having more than one word.

21. The computer system of claim 19, wherein the processor is configured for identifying the subphrase and query phrase as meeting the at least one predefined phrase-refinement criterion when the subphrase appears in the plurality of the previously submitted query phrases a sufficient number of times to be statistically significant.

22. The computer system of claim 19, wherein the processor is configured for:
- searching the query refinement index to identify a plurality of refinement phrases in the query refinement index, wherein each identified refinement phrase in the query refinement index is a refinement of the first new query phrase;
- retrieving a plurality of the identified refinement phrases from the query refinement index; and
- transmitting at least a subset of the plurality of retrieved refinement phrases to the user;
- wherein the transmitted plurality of retrieved refinement phrases are suggested second new query phrases.

23. A computer system for locating a particular record included in a plurality of records, the computer system comprising:
- a first storage device for storing a plurality of previously submitted query phrases;
- a processor connected to the first storage device, the processor configured for:
  - generating a query refinement index comprising a plurality of phrase and refinement phrase pairs from a set of the previously submitted query phrases, including, for each query phrase of a plurality of the previously submitted query phrases:

computing a frequency for the query phrase and at least one subphrase of the query phrase;

determining whether the frequency for the subphrase is greater than the frequency for the query phrase;

identifying the subphrase and the query phrase as meeting at least one predefined phrase-refinement criterion when the frequency for the subphrase is greater than the frequency of the query phrase; and storing the identified subphrase and query phrase in the query refinement index as a phrase and refinement phrase pair;

receiving a first new query phrase from a user;

searching the query refinement index to identify a refinement phrase in the query refinement index that is a refinement of the the first new query phrase;

retrieving the identified refinement phrase from the query refinement index; and transmitting the retrieved refinement phrase to the user;

wherein the retrieved refinement phrase is a suggested second new query phrase.

24. The computer system of claim 23, wherein the at least one predefined phrase-refinement criterion is met when the frequency for the subphrase is greater than the frequency of the query phrase by at least a selected factor.

25. The computer system of claim 23, wherein the processor is configured for computing the number of times the query phrase is included in the plurality of records, and the instructions for computing the frequency of the subphrase include instructions for computing the number of times the subphrase is included in the plurality of records.

26. The computer system of claim 23, wherein the processor is configured for identifying the subphrase and query phrase as meeting the at least one predefined phrase-refinement criterion when the subphrase appears in the plurality of the previously submitted query phrases a sufficient number of times to be statistically significant.

27. The computer system of claim 23, wherein the processor is configured for:

identifying a plurality of refinement phrases in the query refinement index, wherein each identified refinement phrase in the query refinement index is a refinement of the first new query phrase;

retrieving a plurality of the identified refinement phrases from the query refinement index; and transmitting at least a subset of the plurality of retrieved refinement phrases to the user;

wherein the transmitted plurality of retrieved refinement phrases are suggested second new query phrases.

28. The computer system of claim 19, further comprising a second storage device connected to the processor for storing the query refinement index.

29. The computer system of claim 19, wherein the first storage device is configured for storing a log-file of user queries.

* * * * *